United States Patent [19]

Strehler et al.

[11] Patent Number: 4,464,266
[45] Date of Patent: Aug. 7, 1984

[54] REMOVAL OF CAPROLACTAM AND ITS OLIGOMERS FROM COOLING WATER CONTAINING THESE COMPOUNDS

[75] Inventors: Hugo Strehler; Robert Kegel, both of Frankenthal; Guenter Valentin; Werner Hoerauf, both of Ludwigshafen, all of Fed. Rep. of Germany

[73] Assignee: BASF Aktiengesellschaft, Ludwigshafen, Fed. Rep. of Germany

[21] Appl. No.: 385,270

[22] Filed: Jun. 4, 1982

[30] Foreign Application Priority Data

Jul. 8, 1981 [DE] Fed. Rep. of Germany ....... 3126835

[51] Int. Cl.$^3$ .............................................. C02F 1/24
[52] U.S. Cl. .................................. 210/703; 210/712; 210/908; 528/323

[58] Field of Search .................... 55/87; 210/608, 703, 210/712, 718, 750, 758, 764, 765, 908; 528/323

[56] References Cited

U.S. PATENT DOCUMENTS

| | | | |
|---|---|---|---|
| 3,373,145 | 3/1968 | Wagner | 528/323 |
| 3,880,740 | 4/1975 | Mimura et al. | 210/903 |
| 4,267,050 | 5/1981 | Conway et al. | 210/608 |

FOREIGN PATENT DOCUMENTS

| | | | |
|---|---|---|---|
| 49-132856 | 12/1974 | Japan | 210/703 |
| 53-111657 | 9/1978 | Japan | 210/608 |
| 338541 | 6/1972 | U.S.S.R. | 210/703 |

*Primary Examiner*—Peter A. Hruskoci
*Attorney, Agent, or Firm*—Keil & Weinkauf

[57] ABSTRACT

A process for removing caprolactam and its oligomers from cooling water containing these compounds, wherein gases are introduced into the cooling water and the foam which forms is separated off.

3 Claims, No Drawings

REMOVAL OF CAPROLACTAM AND ITS OLIGOMERS FROM COOLING WATER CONTAINING THESE COMPOUNDS

In the preparation of polycaprolactam by polymerization of caprolactam, the molten polycaprolactam is run out as strands and these are passed through a water-bath for cooling. Since polycaprolactam contains about 10% by weight of monomers from the preparation, monomeric and oligomeric caprolactam is continuously washed out of the strands when these are passed through the cooling water. These compounds concentrate in the cooling water and lead to increased growth of algae. A mucous mass then forms in the cooling water and contaminates the polycaprolactam produced.

General procedures for preventing algal growth in water have in fact been disclosed. One procedure is the addition of colloidal silver, but this is very expensive. Other suitable procedures are ozonization of water or addition of formaldehyde, but these may lead to damage to the very sensitive polyamide.

It is an object of the present invention to keep the contents of caprolactam and its oligomers in the cooling water extremely low in order to prevent mucus formation and clouding of the cooling water.

We have found that this object is achieved by a process for removing caprolactam and its oligomers from cooling water containing these compounds, wherein gases are introduced into the cooling water and the foam which forms is separated off.

The novel process has the advantages that the cooling water remains completely clear, the content of caprolactam and its oligomers is minimized in a simple manner, and no foreign substances which have an adverse effect on the polycaprolactam have to be added.

The invention is based on the surprising observation that the foam formed from the cooling water contains about 20% by weight more caprolactam and oligomers than the cooling water.

Cooling water which is in need of treatment and contains caprolactam and its oligomers is obtained, for example, in the preparation of polycaprolactam where the polycaprolactam melt is run out as strands through a die plate and the strands are passed through a waterbath for the purpose of cooling. The solidifying polycaprolactam strands still contain about 10% by weight of monomers and oligomers from the preparation, and a small amount of these is extracted by the cooling water. In order to maintain the cooling water at a uniform temperature, e.g. at from 20° to 30° C., the cooling water is advantageously pumped in circulation over a heat exchanger and recycled. Caprolactam and its oligomers concentrate in the cooling water as a result of continuous operation.

According to the invention, gases are introduced into the cooling water in need of treatment. Examples of suitable gases are air, nitrogen and carbon dioxide. Since it is readily available and does not pollute the environment, air is preferred. Advantageously, from 4 to 8 m$^3$ of gas per hour are used for each m$^3$ of cooling water requiring treatment. The gas can be introduced into the cooling liquid by means of nozzles, frits, jets or other devices known from the prior art for charging liquids with gas. As a rule, the air introduced into the cooling bath via an overflow is sufficient to produce the necessary foam.

Advantageously, foaming is effected in a separate tank, the foam being formed as a result of the gases introduced leaving the cooling liquid. The layer of foam contains about 20% more caprolactam and oligomers than the cooling water. Advantageously, the foam produced is removed continuously, for example by decanting or filtration with suction. The cooling water thus treated is reused for cooling the polycaprolactam strands.

The procedure according to the invention gives, for example, a content of 0.038% by weight of nitrogen in the form of caprolactam and its oligomers in the cooling water. The cooling water is clear and free from mucous constituents.

The following Example illustrates the process according to the invention.

EXAMPLE 0.4 t per hour of polycaprolactam in the form of molten strands is passed through a bath which is 9 m long, 0.5 m wide and 0.5 m high and is filled with 2 m$^3$ of cooling water at 25° C., and solidifies. The bath contains a tubular overflow through which water is continuously discharged, 6 m$^3$ of air per m$^3$ of cooling water being sucked through at the same time. The cooling water discharged is passed into a settling bath equipped with a weir and is then pumped through a cooler. In the settling bath, the air sucked in separates out from the cooling water and forms a layer of foam. The layer of foam is decanted off from the cooling water by the weir and is disposed of, whilst the cooling water thus purified is recycled to the bath for cooling the polycaprolactam strands. The entire circulation contains 100 m$^3$ of cooling water. 170 m$^3$ per hour of cooling water are circulated. During 26 months of operation, the content of extract in the cooling water does not exceed 0.04% by weight of N in the form of caprolactam and its oligomers. The cooling water remains clear. No mucus forms.

We claim:

1. A process for purifying the circulating cooling water that is used in a water bath to solidify polycaprolactam and which contains extracted caprolactam monomers and oligomers which consists essentially of: passing an effective amount of gaseous air, nitrogen or carbon dioxide into the cooling water to form a layer of foam on the water containing said monomers and oligomers, separating the foam containing said monomers and oligomers from the cooling water and recycling said cooling water to said water bath.

2. The process of claim 1, wherein from 4 to 8 m$^3$ of gases are introduced per m$^3$ of cooling water per hour.

3. The process of claim 1, wherein air is used as the gas that is passed into the cooling water to form the layer of foam.

* * * * *